United States Patent [19]
Bien et al.

[11] Patent Number: 5,344,208
[45] Date of Patent: Sep. 6, 1994

[54] REINFORCEMENT ASSEMBLY FOR VEHICLE PANELS

[75] Inventors: Alfred A. Bien, West Bloomfield; Jerry F. Loughlin, Jr., St. Clair Shores, both of Mich.

[73] Assignee: Chrysler Corporation, Highland Park, Mich.

[21] Appl. No.: 803,928

[22] Filed: Dec. 9, 1991

[51] Int. Cl.[5] ............................................. B60R 27/00
[52] U.S. Cl. .................................... 296/187; 296/191; 296/198
[58] Field of Search ............... 296/187, 901, 188, 191, 296/198

[56] References Cited

U.S. PATENT DOCUMENTS

| | | | |
|---|---|---|---|
| 4,912,826 | 4/1990 | Dixon et al. | 296/187 X |
| 4,973,102 | 11/1990 | Bien | 296/187 |
| 4,974,900 | 12/1990 | Destefani et al. | 296/187 |
| 5,102,188 | 4/1992 | Yamane | 296/901 |

Primary Examiner—David M. Mitchell
Assistant Examiner—Gary C. Hoge
Attorney, Agent, or Firm—Edward P. Barthel

[57] ABSTRACT

An improved one-piece plastic bracket for supporting a sealer block of heat expandable reinforcement material on the substructure of a vehicle. The sealer block is adapted, upon being heated during an assembly line operation, to form a closed cell foam stiffener bridging a tolerance varying space between the substructure and an exterior panel. The one-piece bracket provides an initial function of readily supporting the sealer block in a snap-action manner on the vehicle substructure. Additionally, the bracket is operative to precisely guide the heat activated sealer into a predetermined foamed-in-place configuration wherein it sealingly bonds to both the substructure and the opposed inner surface of the panel.

7 Claims, 3 Drawing Sheets

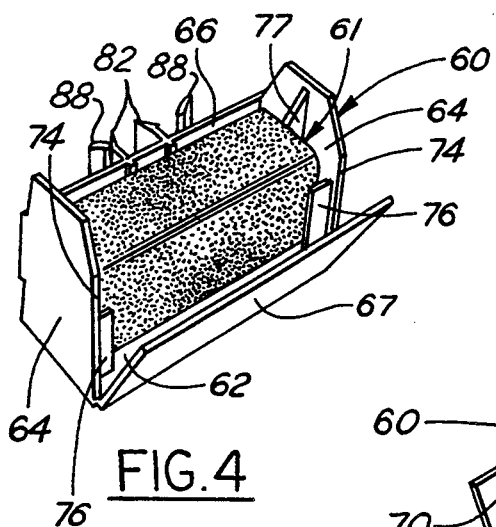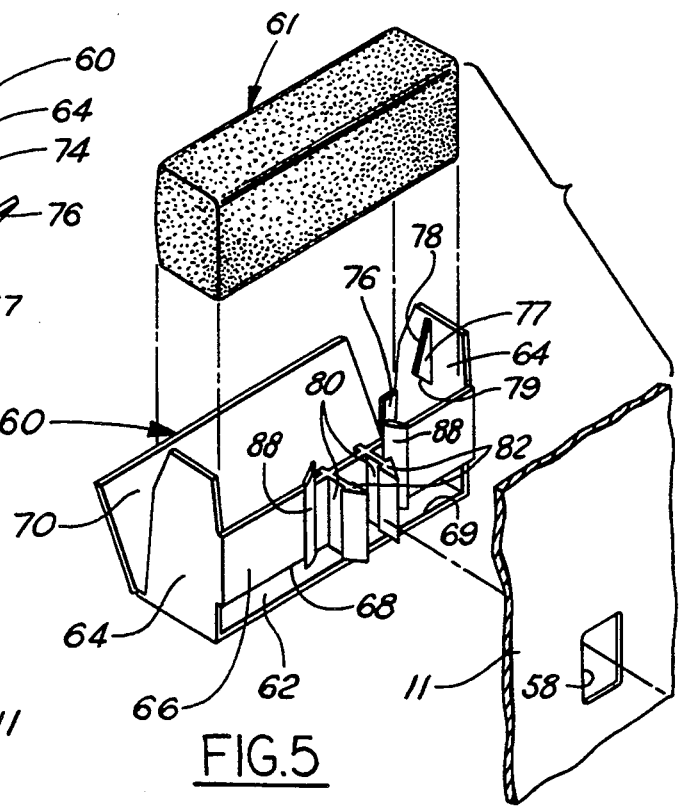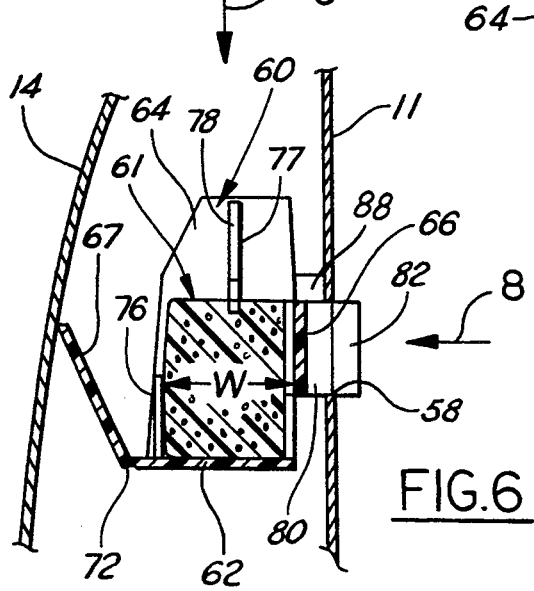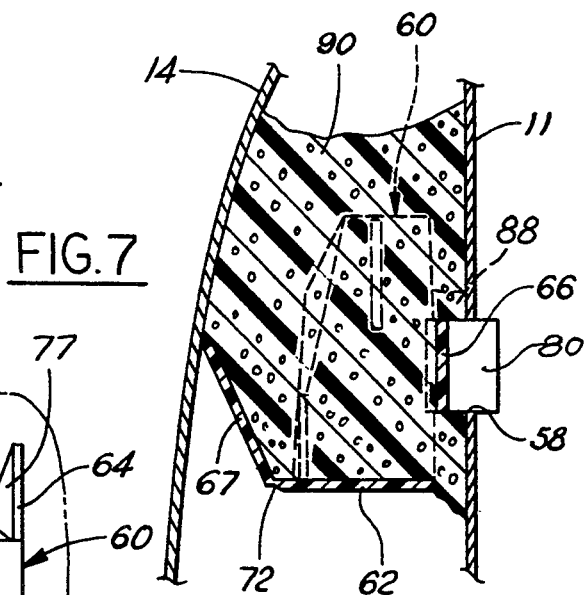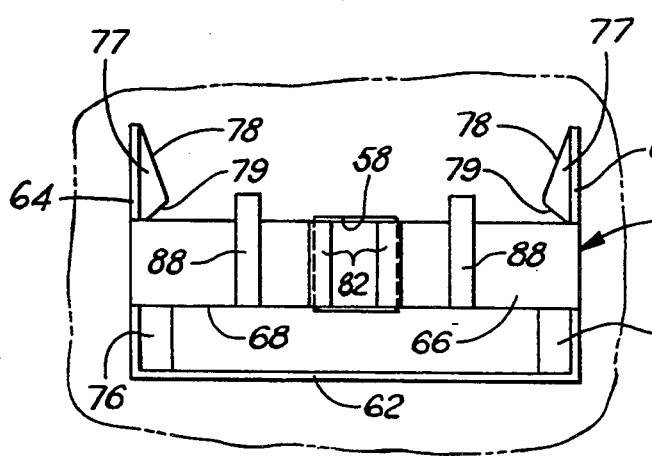

REINFORCEMENT ASSEMBLY FOR VEHICLE PANELS

BACKGROUND OF THE INVENTION

This invention relates generally to automobile body reinforcement arrangements and, more particularly, to a one-piece plastic support bracket supporting a heat expandable closed cell sealer block operative, upon being foamed-in-place, to stiffen a vehicle exterior panel relative to an underlying spaced body substructure.

An example of a known vehicle heat expandable reinforcement bracket assembly is indicated generally at 10 in prior art FIG. 1, wherein the bracket assembly is shown prior to attachment to an inner partition 11 of a vehicle substructure 12 (FIG. 3). With reference to FIG. 2 a vehicle metal fender panel 14 is provided for mounting on portions of the vehicle substructure 12 as shown, for example, in U.S. Pat. No. 4,973,102 issued Nov. 27, 1990 to Bien an inventor of the present invention. The fender panel 14 has an upper aft corner portion supported in a spaced manner from the metal substructure inner partition 11. To prevent the upper corner portion from being easily deflected into an underlying space 16, with the possibility of paint chipping and rattles, the bracket assembly 10 was designed to be installed on a vehicle assembly line.

The prior art bracket assembly 10 comprises a sheet metal bracket 20 formed into a double-L cross-section defining an upright plate 22, having an outboard extending lower flange 24 an inboard extending upper flange 26. FIG. 1 shows the upper flange 26 formed with a central inboard projecting tab 28 operative to sit on an upper horizontal flanged surface 30 of the partition 11 (FIG. 2) upon the bracket plate 22 being positioned in flush contact with partition opposed surface 31. A push-in "Christmas tree" type plastic fastener 32 is provided for insertion in plate hole 34 and aligned partition hole 36 to retain the bracket 20 on the vehicle substructure. It will be noted that the bracket plate 22 has an elongated slot 38 lanced therein for a purpose to be explained.

With reference to FIG. 1 an elongated rectangular sectioned sealer block 40, formed of heat expandable die-cut rubber-based sealer material, has its one side face bonded by heat-staking to the bracket plate opposed outer surface while the block bottom face is heat-staked to the upper surface of the lower flange 24. It will be noted in FIG. 1 that the heat expandable sealer block 40 has its outboard lower edge formed with a co-extensive integral foam directing flap 42 extending upwardly and outwardly at about a 45 degree angle therefrom. Further, FIG. 1 shows the assembly 10 being loosely enclosed by a flexible plastic mesh netting 44. The netting 44 is retained upon being draped over the bracket with its overlapped ends pierced and by the fastener 32 prior to the fastener being inserted in the aligned holes 34 and 36. The fastener 32 has a separate washer 48 for sealing the holes 34 and 36.

In operation, as each vehicle body is advanced on an assembly line, a pair of bracket assemblies 10 are mechanically attached on their associated right and left substructure partitions 11 prior to the vehicle body being spray painted. Upon each vehicle body being subsequently primed and heat cured to a predetermined temperature in a drying oven the heat expandable sealer block 40 undergoes thermal expansion into a closed-cell flexible rubber-based thermofoamed stiffener 46 bridging the space 16 between the vehicle panel 14 and the metal bracket 20. The foamed stiffener 48 provides high compressive resistance together with adhesive characteristics such that upon its thermal expansion it achieves a permanent adhesive bond to the inner surface of the panel 14 and the opposed substructure. An example of one type of heat expandable material suitable for the present invention may be purchased from RuVan Inc., 1175 Diamond Avenue, Evansville, Ind. 47711 under their vendor code: Type A - B-237E.

In a similar manner the thermofoamed closed cell stiffener 48 expands through the plate slot 38 adhesively bonding to the outer surface of the metal substructure partition 11. As a result the foamed-in-place stiffener 48 provides high compression resistance preventing the fender panel 14 from being easily deflected into the space 16. It will be noted that the mesh netting is required to prevent any of the heat activated sealer material 46 from flowing downwardly past the guide flap 42 during the time the sealer material is undergoing thermal expansion and curing.

SUMMARY OF THE INVENTION

It is an object of the present invention to provide an improved one-piece plastic bracket for retaining a heat expandable sealer block operative, when thermally expanded, for establishing a foamed-in-place stiffener bridging the space between a vehicle exterior panel and an underlying metal substructure which is substantially easier, faster, and more economical to install than previously known devices.

It is another object of the present invention to provide an improved one-piece plastic bracket as set forth above formed with a pair of integral resilient attaching fingers adapted to be lockingly received in a substructure mounting aperture and wherein integral flexible fins are provided on either side of the fingers operative to seal the side portions of the aperture obviating the need for a separate sealing means.

It is still another object of the present invention to provide an improved one-piece plastic bracket as set forth above wherein the bracket is enclosed on five sides by panels operative to guide the expanding foamed-in-place stiffener while obviating the need of enclosing the bracket with means, such as separate mesh netting, to contain the expanding foam material against spillage.

It is yet another feature of the present invention to provide an improved one-piece plastic bracket which substantially reduces the number of parts required and production processes that must be performed before and during the assembly of the vehicle, especially on a mass production vehicle assembly line.

DESCRIPTION OF THE DRAWINGS

These and other objects, features and advantages of the invention will become apparent to those skilled in the art upon reading the following detailed description with reference to the accompanying drawings in which:

FIG. 4 is a perspective view of the improved one-piece bracket supporting a heat expandable sealer;

FIG. 5 is a fragmentary exploded perspective view of the one-piece bracket and heat expandable sealer and its associated vehicle substructure wall;

FIG. 6 is a fragmentary vertical sectional view, partly in elevation, showing the one-piece bracket mounted on a vehicle substructure wall supporting the heat expandable sealer prior to being heated;

FIG. 7 is a fragmentary sectional view similar to FIG. 6 showing the heat expandable sealer in its foamed-in-place expanded mode;

FIG. 8 is a side elevational view taken in the direction of arrow "8" in FIG. 6;

DETAILED DESCRIPTION OF THE INVENTION

Figure 1:
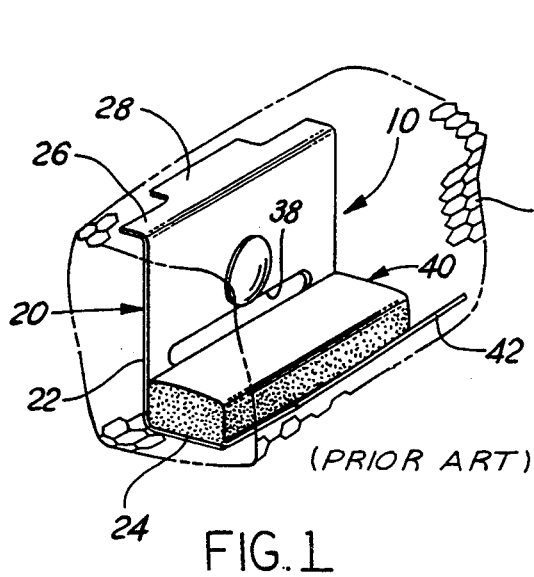
FIG. 1 is a fragmentary perspective view of a prior art bracket assembly retaining a heat expandable sealer for reinforcing a vehicle exterior metal panel.
Figure 2:
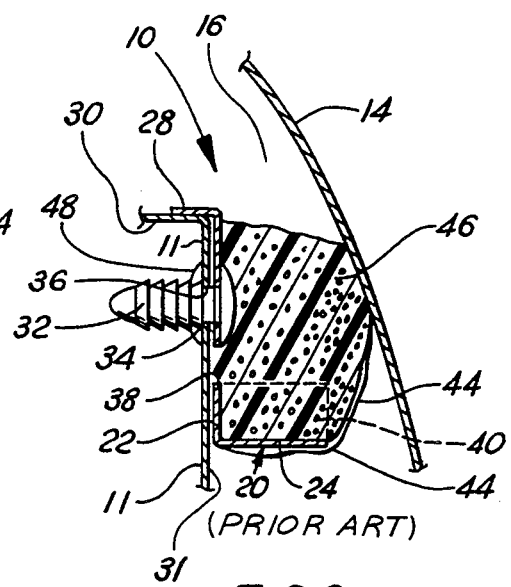
FIG. 2 is a fragmentary vertical sectional view of the FIG. 1 prior art bracket assembly mounted to a vehicle inner substructure wall and showing the heat expandable sealer foamed-in-place into a reinforcing stiffener bonding with an exterior fender panel and an inner substructure wall.
Figure 3:
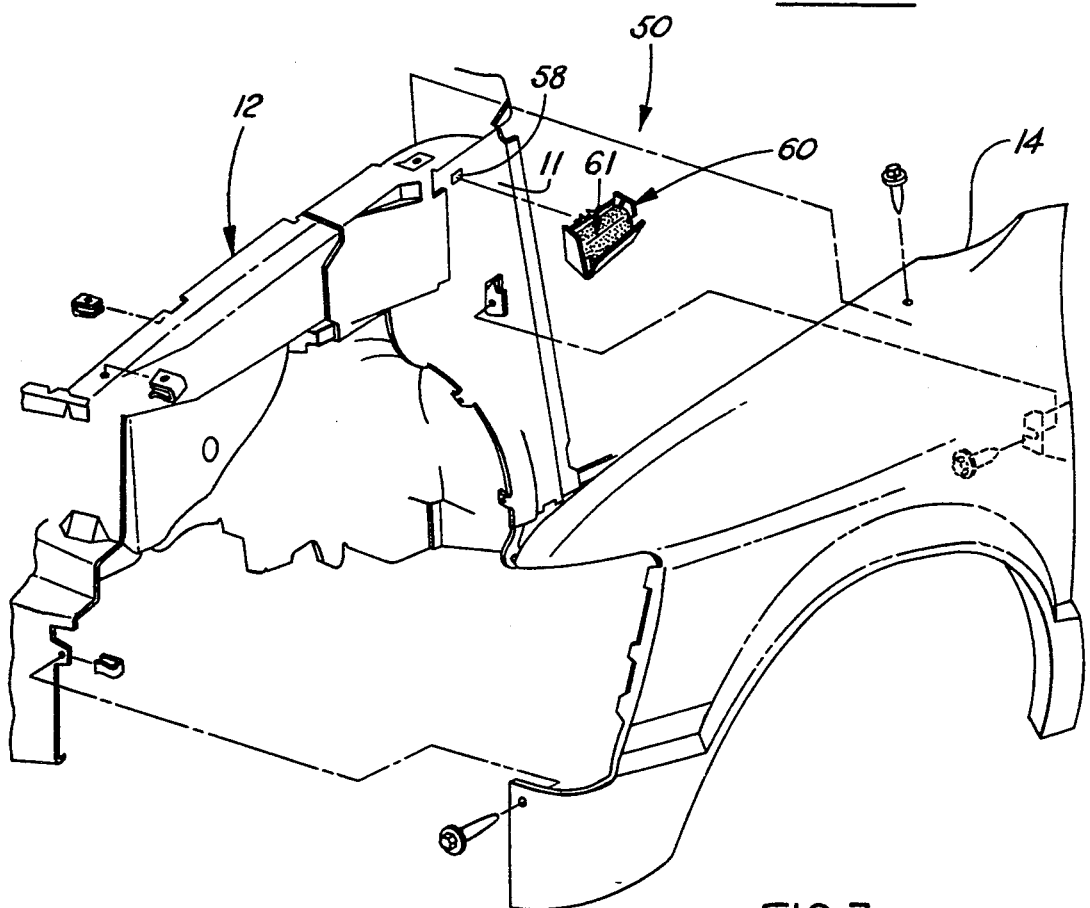
FIG. 3 is a fragmentary exploded perspective view of the front part of a vehicle body comprising a front fender panel and supporting frame substructure depicting a partition wall mounting aperture adapted for receiving attachment means of the improved one-piece plastic bracket of the present invention.

Turning now to the present invention, FIG. 3 depicts the front end of a vehicle body frame 50 showing an arrangement for securing a metal fender panel 14 on a substructure frame assembly 12. The substructure includes a frame partition 11 formed with a rectangular mounting aperture 58 adapted to receive therethrough attaching means integrally formed on an one-piece bracket 60. The bracket 60, molded from suitable resilient plastic material such as Nylon, is adapted for retaining a die cut rectangular block 61 of a heat expandable or foamable rubber-based closed cell sealer material. The material comprising block 61, in the present embodiment, has the same composition and coefficient of thermal expansion as the sealer block 40 disclosed in prior art FIGS. 1 and 2.

As best seen in FIGS. 4, 5 and 6 the one-piece generally thin-walled plastic box-like bracket 60 enclosed on five sides defining between them a generally rectangular open-topped cavity sized for retaining the block 61. The bracket 60 comprises a base panel 62, a pair of opposite upright identical side panels 64 secured to the base panel at their lower edges, an upright rear panel 66 extending between and secured to the side panels 64, and an oblique front panel 67. The rear panel 66 has its lower longitudinally extending edge 68 spaced a predetermined distance above the base panel 62 defining a rectangular shaped elongated opening 69 therebetween.

As best seen in FIGS. 4-6 the oblique front panel 67 is connected along the base panel front longitudinal edge by an integral flexible juncture 72. The oblique front panel 67 is inclined upwardly and outwardly therefrom at a predetermined obtuse angle of about one hundred and twenty (120) degrees with the base panel 62. It will be noted in FIG. 4 that the forward edges 74 of the side panels 64 are respectively provided with opposed vertically extending rails 76 disposed parallel to the rear panel 66. FIG. 6 shows the rails 76 spaced a predetermined dimension "W" from the rear panel 66 slightly greater than the width of the sealer block 61. The five panels 62, 64—64, 66 and 67 together with the pair of rails 76 form between them a substantially rectangular cavity sized for receiving therein the heat expandable sealer block 61.

With reference to FIGS. 5 and 8 it will be seen that each of the side panels 64 have their inner opposed surfaces formed with retention members in the form of ears 77. The retention ears 77 have upper sloped lead-in edges 78 and lower beveled retention edges 79. The lead-in edges are operative, upon being contacted by a sealer block 61 being pressed downwardly into the bracket cavity, to outwardly expand associated side panels 64 allowing the sealer block to be seated on the base panel 62. The lower retention edges 79 frictionally contact their associated block 61 upper transverse edges to capture the block in the bracket conforming cavity.

Figure 10:
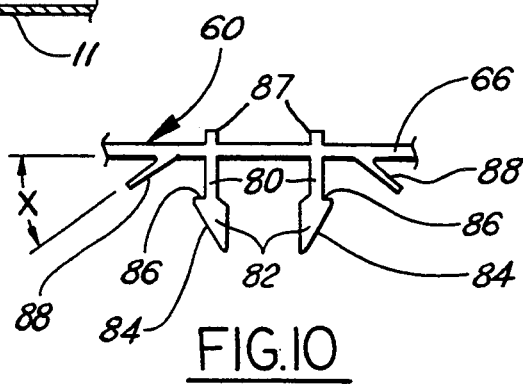
FIG. 10 is an enlarged fragmentary detail view showing the portion in the circle "10" in FIG. 9.
Figure 11:
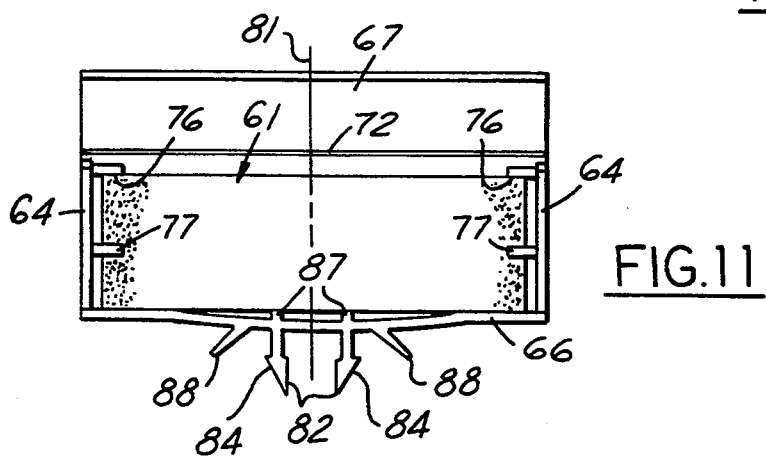
FIG. 11 is a view similar to FIG. 10 prior to the insertion of the locking fingers 80 into the frame partition aperture 58.

As seen in FIG. 6 the rear panel 66 has its exterior surface formed with a pair of longitudinally spaced apart vertically extending mirror image flexure fingers 80 adapted to extend a distance into the substructure rectangular aperture 58. FIG. 10 shows the fingers 80 formed with integral locking prongs 82 comprising oppositely facing ramps 84 and shoulders 86. The fingers 80 also have interior vertically extending ribs 87. Each prong ramp 84 is adapted to coact with its associated vertical edge of aperture 58 in a manner to deflect the pair of fingers 80 inward upon insertion through the aperture and thereafter returning them to their normal state wherein each prong shoulder 86 lockingly engages its associated aperture vertical edge. It will be noted in FIG. 11 that the pair of ribs 87 cause the center portion of rear panel 66 to bow out rearwardly in a convex manner upon insertion of the block 61 into the bracket cavity. The bowed-out panel portion increases its rigidity providing ready deflection of the locking prongs 82 toward each other facilitating their insertion through the aperture 58. It will be noted that the pair of fingers 80 are disposed in a symmetrical manner on either side of a transverse vertically extending plane of symmetry of said bracket which includes the dashed construction line 81 in FIG. 11.

Figure 9:
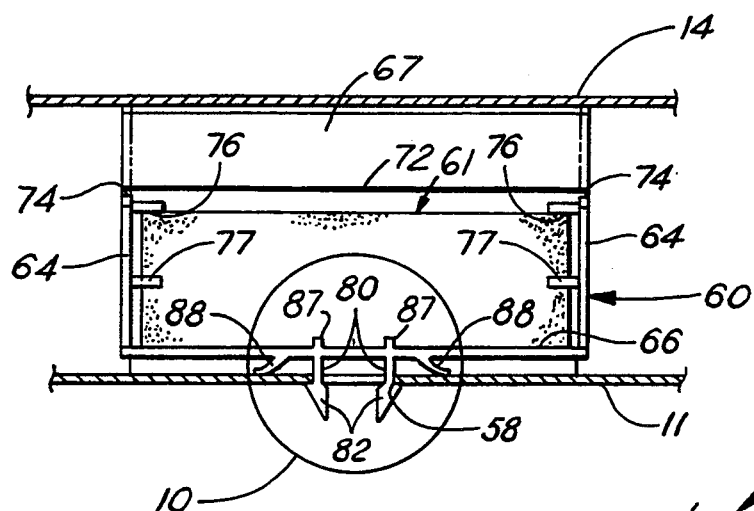
FIG. 9 is a top elevational view taken in the direction of arrow "9" in FIG. 6.

With reference to FIGS. 5 and 10 it will be seen that the exterior surface of the rear panel 66 is formed with a pair of mirror image vertically extending flexible fins 88. The fins 88 are longitudinally spaced apart and are canted outwardly at an angle "X" (FIG. 10) of about thirty degrees to the rear panel on either side of the fingers 80. FIG. 9 shows that upon the prongs 82 being locked in the aperture 58 the fins 88 are compressed by the opposed surface of the substructure partition 11 causing the fins to be urged toward the bracket rear panel 66 thereby assisting in both positively locking the prongs 82 and sealing the aperture 58. The heat expandable sealer block 61, upon being foamed-in-place to provide a foamed stiffener 90, bonds to the upper free extended ends of the fins 88 insuring that the upper edge of the aperture 58 is sealed, as seen in FIG. 7, along with the aperture side and bottom edges.

Although the present invention has been shown and described with reference to a preferred embodiment thereof, and in terms of the illustrated drawings, it should not be considered as limited thereby. Thus, various possible modifications, omissions, and alternatives could be conceived by one skilled in the art without departing from the scope of the present invention.

therefore, the scope of the invention should be defined solely by the scope of the appended claims which follow.

What is claimed is:

1. In a bracket for supporting a heat expandable sealer block arrangement which, upon being thermally activated to a predetermined temperature, provides a foamed stiffener operative for reinforcing a panel secured to an automobile vehicle body substructure having a mounting aperture formed therein, said panel supported on the substructure such that a variable tolerance dimensional space is defined between the substructure and the panel inner surface, the improvement in said bracket comprising:

a one-piece thin-walled plastic box-like bracket enclosed on four sides having a base panel, a pair of opposite upright identical side panels secured to said base panel at the lower edges thereof, and an upright rear panel extending between and secured to said side panels, said four panels forming between them an open-fronted open-topped cavity sized for receiving the heat expandable sealer block;

said base panel having front and rear longitudinal edges, an oblique shield panel being flexibly connected along said base panel front longitudinal edge such that said shield panel is inclined upwardly and outwardly therefrom at a predetermined obtuse angle with said base panel;

said rear panel having a lower longitudinal edge thereof spaced a predetermined dimension vertically upwardly from said base panel rear longitudinal edge so as to define an elongated opening therewith, said rear panel formed with a pair of longitudinally spaced apart mirror image flexure fingers adapted to extend a distance into the substructure mounting aperture, each said finger having an integral locking prong comprising a ramp and a shoulder, each said prong ramp adapted to coact with the substructure mounting aperture in a manner to deflect said pair of fingers inward upon insertion through the aperture and thereafter returning to their normal state wherein each said prong shoulder lockingly engages an associated edge of the substructure aperture;

said side panels having its upstanding pair of forward edges thereof being respectively provided with opposed vertically extending rails disposed parallel to said rear panel, said rail members spaced a predetermined dimension from said rear panel slightly greater than said sealer block width dimension thereof, said pair of rails defining a vertically disposed plane that includes the open-front of said bracket cavity;

said side panels having their opposed inner surfaces formed with opposed mirror image integral retention members adjacent their associated upper transverse edges adapted to coact with the sealer block upper surface thereof in a manner to deflect said side panels outward upon insertion of said sealer block through the opened-top of said bracket cavity and thereafter upon said sealer block having a bottom surface thereof supported on said base panel each said side panel returning to its normal state, wherein each retention member lockingly engages an associated upper end edge of said block upper surface and each said side panel rail member engaging an associated opposed block front surface portion thereof capturing said block in said bracket cavity; and said sealer block adapted upon being heat activated to a predetermined expanding temperature to foam-in-place in a predetermined directed manner by said side, rear and guide panels thereby defining a foamed stiffener bridging the space between the body panel and the substructure so as to sealing engaging both inner opposed surfaces thereof providing a high compressive resistant foam stiffener bridge therebetween.

2. The bracket as set forth in claim 1 wherein each said retention member in the form of a triangular-shaped ear defining an upper sloped edge and a lower beveled edge.

3. The bracket as set forth in claim 1 wherein each said flexure finger having a vertically extending rib formed as a continuation on the interior surface of said rear panel, said ribs operative upon the insertion of said sealer block to cause a center portion of said rear panel to bow-out in a convex manner thereby increasing the rigidity of said rear panel and facilitating the insertion of each said flexure finger locking prong through said substructure mounting aperture.

4. The bracket as set forth in claim 1 wherein said rear panel having an exterior surface thereof formed with a pair of mirror image vertically extending flexable fins, said pair of fins being longitudinally spaced apart and canted outwardly at an acute angle to said rear panel surface on either side of said pair of flexure fingers.

5. The bracket as set forth in claim 1 wherein each said fin extends vertically upwardly a predetermined dimension above the upper edge of said mounting aperture.

6. The bracket as set forth in claim 1 wherein said shield panel is inclined upwardly an outwardly at an obtuse angle of about 120 degrees with respect to said base panel.

7. The bracket as set forth in claim 4 wherein said fins canted outwardly at an acute angle of about 30 degrees from said rear panel.

* * * * *